(12) United States Patent
Naito et al.

(10) Patent No.: US 9,008,358 B2
(45) Date of Patent: Apr. 14, 2015

(54) ENCODING A SPECIFIC AREA WITH HIGHER QUALITY THAN A NON-SPECIFIC AREA

(75) Inventors: Satoshi Naito, Yokohama (JP); Saku Hiwatashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 13/461,570

(22) Filed: May 1, 2012

(65) Prior Publication Data

US 2012/0294480 A1    Nov. 22, 2012

(30) Foreign Application Priority Data

May 19, 2011    (JP) .................................. 2011-112896

(51) Int. Cl.
G06K 9/00    (2006.01)
H04N 19/55   (2014.01)

(52) U.S. Cl.
CPC ..................................... H04N 19/55 (2014.11)

(58) Field of Classification Search
None
See application file for complete search history.

(56) References Cited

U.S. PATENT DOCUMENTS

| 7,106,909 B2 | 9/2006 | Satoh et al. | 382/239 |
| 7,215,818 B2 | 5/2007 | Naito | 382/239 |
| 8,208,743 B2 | 6/2012 | Naito | 382/233 |
| 2004/0151244 A1* | 8/2004 | Kim et al. | 375/240.03 |
| 2008/0152007 A1* | 6/2008 | Sekiguchi et al. | 375/240.14 |

FOREIGN PATENT DOCUMENTS

JP    2007-336259    12/2007

OTHER PUBLICATIONS

"Information Technology—Coding of Audio-Visual Objects—Part 2: Visual", ISO/IEC International Standard 14496-2 (MPEG-4 Visual), Second Edition, Dec. 1, 2001.
"Information Technology—Coding of Audio-Visual Objects—Part 10: Advanced Video Encoding", ISO/IEC International Standard 14496-10 (MPEG-4 Advanced Video Coding), First Edition, Dec. 1, 2003.
"Information Technology—Generic Coding of Moving Pictures and Associated Audio Information: Video", ISO/IEC International Standard 13818-2 (MPEG-2), 1995.
"Series H: Audiovisual and Multimedia Systems Infrastructure of Audiovisual Services—Coding of Moving Video", Recommendation ITU-T H.264, Advanced Video Coding for Generic Audiovisual Series (MPEG-4 AVC/H.264), Jun. 2011.

* cited by examiner

*Primary Examiner* — Atiba O Fitzpatrick
(74) *Attorney, Agent, or Firm* — Fitzpatrick, Cella, Harper & Scinto

(57) ABSTRACT

An image of a prescribed frame of images of respective frames is set as a target image, and an area including a prescribed pattern is detected from the target image as a specific area. An image other than the target image is set as a non-target image, and the specific area in the non-target image is predicted. The images of the respective frames are encoded so that the specific area is encoded to have higher image quality than an area other than the specific area. In encoding, the images of the respective frames are encoded so that the specific area in the non-target image is not referred to from another frame.

9 Claims, 8 Drawing Sheets

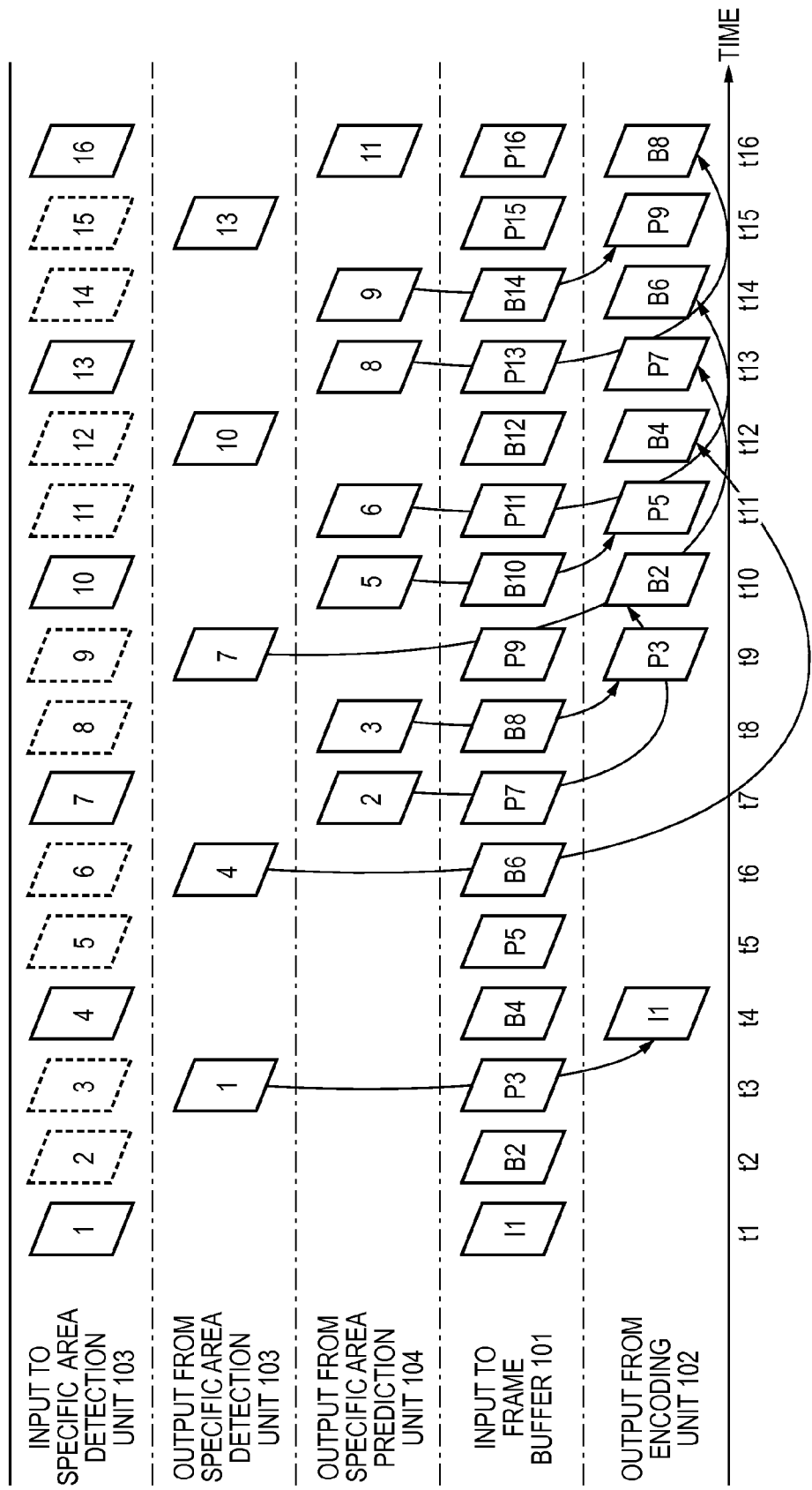

ENCODING A SPECIFIC AREA WITH HIGHER QUALITY THAN A NON-SPECIFIC AREA

BACKGROUND OF THE INVENTION

1. Field of the Invention

The present invention relates to a technique for detecting an area including a specific object from an image, and encoding the image based on the detection result.

2. Description of the Related Art

In order to transmit, store, and reproduce a moving image, an image signal encoding technique is used. As a moving image encoding technique, an international standard coding method such as ISO/IEC International Standard 13818 (MPEG-2) is known. As another international standard coding method, ISO/IEC International Standard 14496-2 (MPEG-4 Visual) is known. Also, ITU-T Rec. H.264 Advanced Video Coding|ISO/IEC International Standard 14496-10 (MPEG-4 AVC/H.264; to be referred to as H.264 hereinafter) is known. These techniques are used in the fields of digital cameras, video cameras, recorders, and the like.

On the other hand, in recent years, processing for specifying an area including a specific object such as a human face (to be referred to as a specific area hereinafter), which seems to be important, from an image, and changing encoding parameters such as quantization values for the specific area and the remaining area is executed. With this processing, image quality is improved for the specific area, and a code amount is suppressed for the remaining area, thereby improving the image quality of the area including the object which seems to be important, while maintaining an allowable bit rate for a recording medium or communication path.

In order to implement the aforementioned processing, processing for detecting a specific area has to be executed for all frames included in input moving image data. However, it is difficult to execute the processing for detecting a specific area with high accuracy (to be referred to as "specific area detection processing" hereinafter) at the same frame rate as that of encoding.

To solve such problem, a related art which predicts a specific area using motion vectors detected at the encoding timing (to be referred to as "specific area prediction processing" hereinafter) is disclosed (patent literature 1 (Japanese Patent Laid-Open No. 2007-336259)). In patent literature 1, when a motion vector of a block in a frame for which the specific area detection processing is skipped indicates a specific area in a frame which has undergone the specific area detection processing, that block is predicted as the specific area.

In general, in motion vector detection processing, a location where a difference of pixel values between blocks is minimized is detected as a motion vector. Therefore, even when a specific area prediction target block includes an area which seems to be important, since a motion vector of that block does not always indicate a specific area of a frame which has undergone the specific area detection processing, that block is often not predicated as the specific area.

Since a code amount is suppressed by increasing quantization values for an area other than the specific area, if the prediction accuracy of the specific area is low, image quality of an area, which is to be originally predicted as a specific area, may drop. When a location which falls short of specific area prediction is referred to in inter-frame predictive coding processing, quantization errors propagate, thus also dropping the image qualities of subsequent frames.

SUMMARY OF THE INVENTION

The present invention has been made in consideration of the aforementioned problems, and provides a technique for reducing cost required for a frame buffer while improving image quality of a specific area.

According to the first aspect of the present invention, there is provided an image processing apparatus comprising: an input unit that sequentially inputs images of frames included in a moving image; a unit that sets an image of a prescribed frame of the images of the respective frames as a target image, and detects an area including a prescribed pattern from the target image as a specific area; a prediction unit that sets an image other than the target image as a non-target image, and predicts the specific area in the non-target image; and an encoding unit that encodes the images of the respective frames so that the specific area is encoded to have higher image quality than an area other than the specific area, wherein the encoding unit encodes the images of the respective frames so that the specific area in the non-target image is not referred to from another frame.

According to the second aspect of the present invention, there is provided an image processing method to be executed by an image processing apparatus, comprising: an input step of sequentially inputting images of frames included in a moving image; a step of setting an image of a prescribed frame of the images of the respective frames as a target image, and detecting an area including a prescribed pattern from the target image as a specific area; a prediction step of setting an image other than the target image as a non-target image, and predicting the specific area in the non-target image; and an encoding step of encoding the images of the respective frames so that the specific area is encoded to have higher image quality than an area other than the specific area, wherein in the encoding step, the images of the respective frames are encoded so that the specific area in the non-target image is not referred to from another frame.

Further features of the present invention will become apparent from the following description of exemplary embodiments with reference to the attached drawings.

BRIEF DESCRIPTION OF THE DRAWINGS

FIG. 8 is a timing chart showing input/output processes of respective units.

DESCRIPTION OF THE EMBODIMENTS

Embodiments of the present invention will be described hereinafter with reference to the accompanying drawings. Note that embodiments to be described hereinafter are examples when the present invention is carried out practically, and are practical embodiments of the arrangements described in the scope of the claims.

[First Embodiment]

An image processing apparatus of this embodiment encodes respective frames included in a moving image. An example of the functional arrangement of the image processing apparatus according to this embodiment will be described below with reference to the block diagram shown in FIG. 1. Images of respective frames included in a moving image (moving image data) are sequentially input to a frame buffer 101 and specific area detection unit 103.

The frame buffer 101 is a readable/writable memory, and has a capacity capable of storing as many images as the number of frames, which are required in subsequent processes.

The specific area detection unit 103 sets images of prescribed frames of the images of the respective input frames as target images, and detects, as a specific area, an area including a prescribed pattern from each target image. The prescribed pattern is predetermined as that to be detected from an image such as a human body or human face. A technique for detecting a prescribed pattern from an image is given, and the prescribed pattern is not limited to specific one in this embodiment. Hence, a description thereof will not be given. When the specific area detection unit 103 detects a specific area, it outputs coordinate positions (for example, those of upper right and lower left corners; however, the present invention is not limited to coordinate positions as long as the specific area in the target image can be specified) of the detected specific area.

A specific area prediction unit 104 sets images other than the target images as non-target images, and predicts the specific area in each non-target image by interpolation using the target images. For example, the specific area prediction unit 104 predicts the specific area in the non-target image by interpolation using two target images which are located before and after the non-target image in a frame order.

Figure 5:
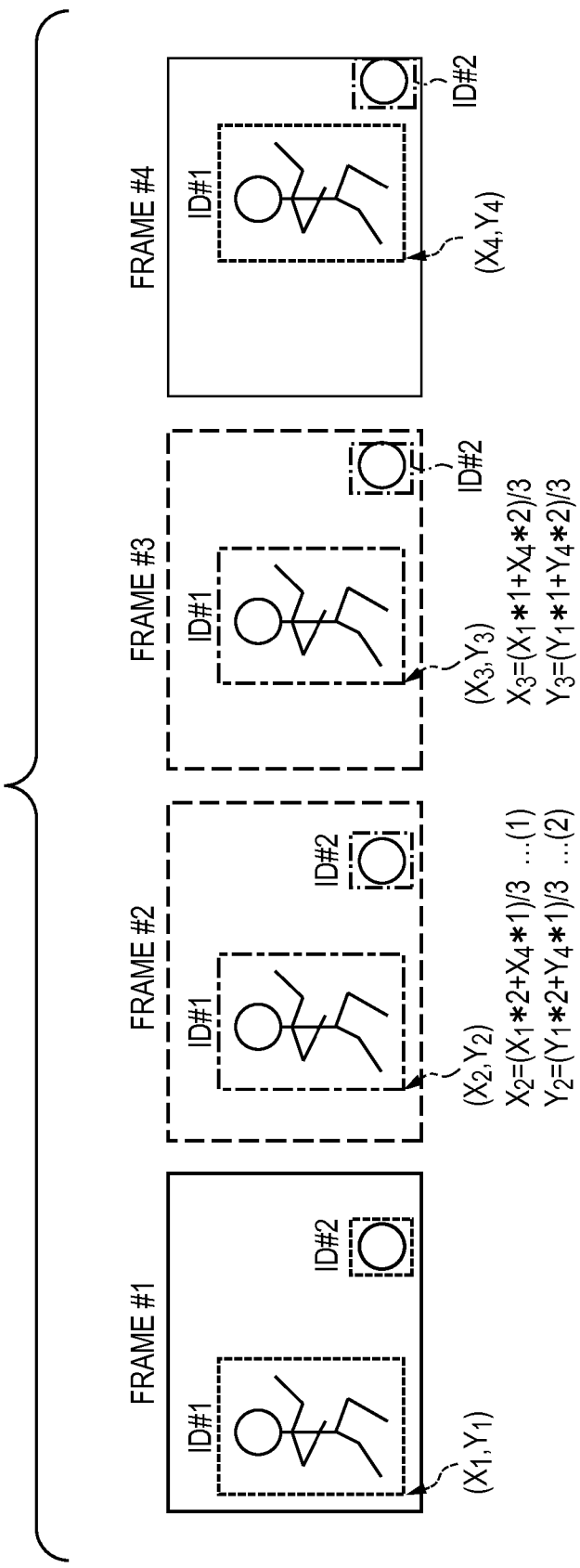
FIG. 5 is a view for explaining a prediction method by a specific area prediction unit 104.

Note that the prediction method of the specific area in the non-target image by the specific area prediction unit 104 is not limited to a specific method. An example of the prediction method will be described below with reference to FIG. 5. When the specific area detection unit 103 detects a prescribed pattern from a target image, it issues an ID unique to that area. In FIG. 5, two patterns are detected from an image of a frame #1 as a target image: ID#1 is assigned to one pattern, and ID#2 is assigned to the other pattern. Also, from a frame #4 as a target image, areas respectively corresponding to ID#1 and ID#2 are detected.

Then, when the specific area prediction unit 104 predicts specific areas in a frame #2 as a non-target image, it selects the specific areas assigned the same IDs in the frames #1 and #4. Assume that the specific area assigned ID#1 is selected. In this case, using a coordinate position (x1, y1) of the specific area #1 in the frame #1 and a coordinate position (x4, y4) of the specific area #1 in the frame #4, the specific area prediction unit 104 predicts a coordinate position (x2, y2) of the specific area #1 in the frame #2 by calculating:

$$x2=(2 \times x1+1 \times x4)/3$$

$$y2=(2 \times y1+1 \times y4)/3$$

The same applies to a case in which the specific area #2 is selected. The specific area prediction unit 104 executes such processing also for a frame #3. Thus, the specific areas (coordinate positions thereof) in the frames #2 and #3 can be predicted.

Figure 4:
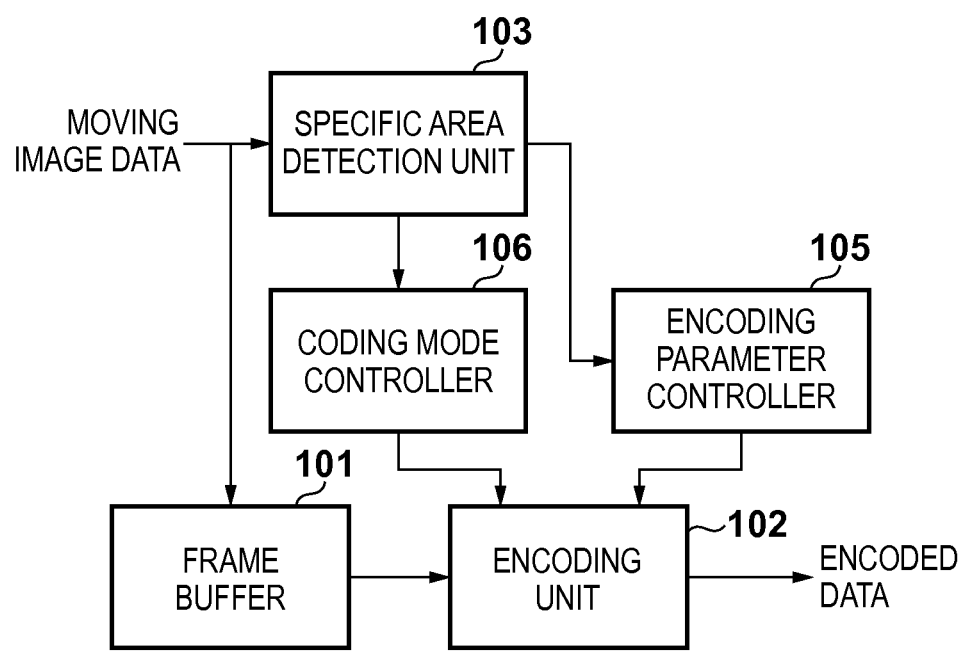
FIG. 4 is a block diagram showing another example of the functional arrangement of the image processing apparatus.

As another specific area prediction method, for example, the so-called extrapolation, which predicts a specific area using two target images, which are located temporally before a non-target image, may be executed. When the frame rate of an input moving image is high, and a processing frame rate of the specific area detection unit 103 is close to that of an encoding unit 102, the specific area prediction unit 104 may be omitted, as shown in FIG. 4. In this case, an encoding parameter controller 105 may use the specific area detection result of a previous frame intact in processing of the current frame, or may use a result obtained by expanding a specific area of the previous frame by several pixels in forward, backward, right, and left directions under the assumption that an object located in the specific area moves. Furthermore, the specific area may be predicted by the method disclosed in patent literature 1.

Irrespective of the method to be used, the specific area prediction unit 104 outputs the coordinate positions of the predicted specific areas as in the specific area detection unit 103.

The encoding unit 102 divides an image of each frame into a plurality of pixel blocks, and encodes each pixel block. Thus, the encoding parameter controller 105 sets encoding parameters for this image so that pixel blocks included in each specific area at the coordinate position output from the specific area detection unit 103 or specific area prediction unit 104 are encoded with a higher image quality than other pixel blocks. This aims at encoding each specific area to have higher image quality than areas other than the specific area.

Assume that an image of a frame of interest to be encoded by the encoding unit 102 is a target image. In this case, encoding parameters for this image are set, so that pixel blocks included in a specific area specified by the coordinate position output from the specific area detection unit 103 for this target image are encoded to have higher image quality than other pixel blocks. On the other hand, assume that an image of a frame of interest to be encoded by the encoding unit 102 is a non-target image. In this case, encoding parameters for this image are set, so that pixel blocks included in a specific area specified by the coordinate position output from the specific area prediction unit 104 for this non-target image are encoded to have higher image quality than other pixel blocks.

For example, quantization steps for pixel blocks included in the specific area are set to be finer, and those for pixel blocks which are not included in the specific area are set to be coarser. With this processing, a bit rate can be suppressed to a desired value, while image quality of an area such as a human body or face, which seems to be perceptually important, is improved. Note that the encoding parameters may be quantization tables, or in case of a coding method which can control a resolution and sub-sampling in a frame, they may be controlled.

A coding mode controller 106 sets a coding mode of the encoding unit 102 for each frame. Since this embodiment will give the following description under the assumption that the coding method of the encoding unit 102 is MPEG-2, the coding mode controller 106 sets, for each frame, one of an intra-frame coding method, forward predictive coding method, and bi-directional predictive coding method. A setting method of the coding mode by the coding mode controller 106 will be described in detail later.

The encoding unit 102 reads out an image for each frame from the frame buffer 101, and encodes the readout image. The encoding processing is executed using the coding method set by the coding mode controller 106 and the encoding parameters set by the encoding parameter controller 105. Note that this embodiment will give the following description under the assumption that the coding method of the encoding unit 102 is MPEG-2. Alternatively, other coding methods such as MPEG-4 and H.264 may be used.

Figure 2:
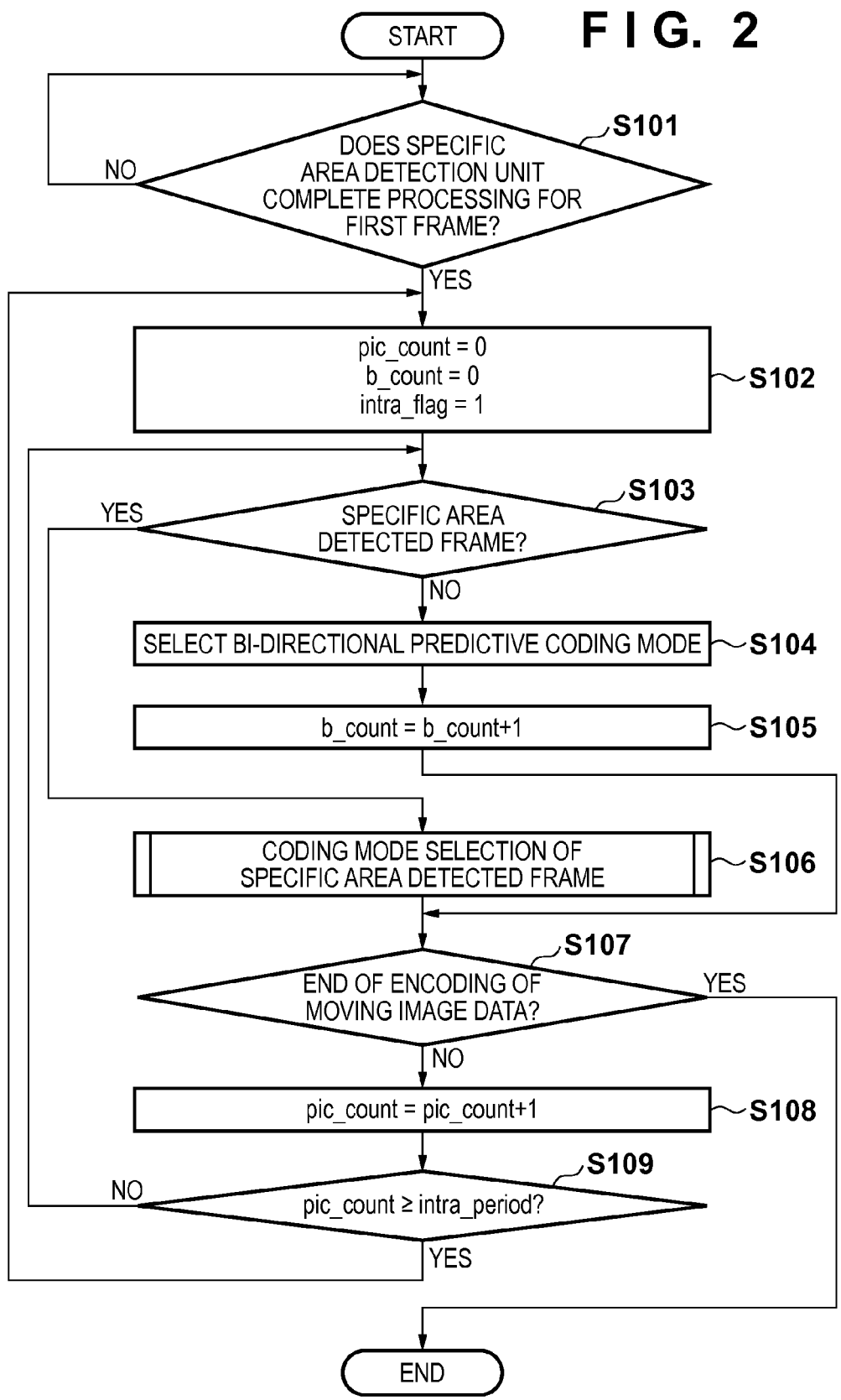
FIG. 2 is a flowchart of processing to be executed by a coding mode controller 106.

Processing for deciding the coding mode for each frame by the coding mode controller 106 will be described below with reference to FIG. 2 which shows the flowchart of that processing.

If the specific area detection unit 103 has extracted specific areas from a first frame (target image) included in a moving image, the process advances to step S102 via step S101; if the extraction processing is not complete yet, the control waits in step S101. During this waiting state, images of respective frames are sequentially input to the frame buffer 101.

In step S102, a variable pic_count used to indicate the total number of frames which have already been encoded by the encoding unit 102 and a variable b_count used to indicate the total number of frames which have already been encoded by the encoding unit 102 according to the bi-directional predictive coding method are initialized to "0". Furthermore, a flag infra_flag indicating whether or not the next frame is to be encoded according to the intra-frame coding method is initialized to "1".

It is judged in step S103 whether or not a frame of interest to be encoded by the encoding unit 102 is a target image (an image from which specific areas are extracted by the specific area detection unit 103). As a result of this judgment, if the frame of interest to be encoded is the target image, the process jumps to step S106; otherwise, the process advances to step S104.

In step S104, a coding mode in which a frame encoded in this mode is not referred to from other frames is set as a coding mode for the frame of interest to be encoded by the encoding unit 102. Since the coding method of this embodiment assumes MPEG-2, a bi-directional predictive coding mode (a mode for executing encoding according to the bi-directional predictive coding method) is practically set. In step S105, the value of the variable b_count is incremented by "1", and the process then jumps to step S107.

Figure 3:
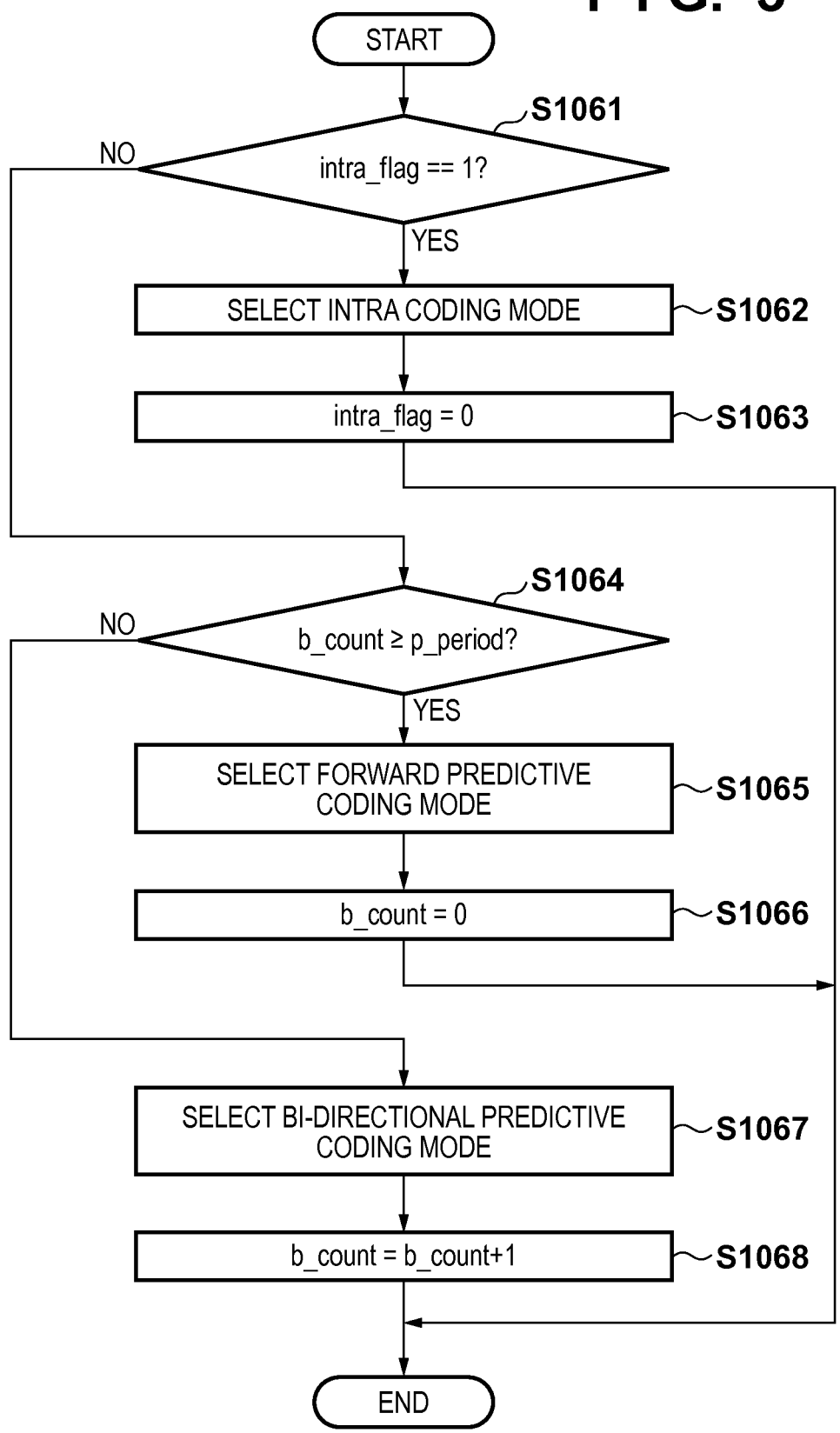
FIG. 3 is a flowchart showing details of processing in step S106.

On the other hand, in step S106, the coding mode for the frame of interest to be encoded by the encoding unit 102 is set by processing according to the flowchart shown in FIG. 3. Details of the processing in step S106 will be described later.

If encoding of all the frames is complete by the encoding unit 102, this processing ends via step S107; if frames to be encoded still remain, the process advances to step S108 via step S107.

In step S108, the value of the variable pic_count is incremented by "1". It is then judged in step S109 whether or not the incremented value of the variable pic_count is equal to or larger than a variable intra_period. This variable intra_period represents an interval of frames to be encoded according to the intra-frame coding method, and assume that "15" is set in advance in this embodiment. That is, in this embodiment, encoding according to the intra-frame coding method is executed every 15th frame. Of course, the value of the variable intra_period is not limited to this value.

If the incremented value of the variable pic_count is equal to or larger than the value of the variable intra_period, the process returns to step S102. On the other hand, if the incremented value of the variable pic_count is smaller than the value of the variable intra_period, the process returns to step S103.

Details of the processing in step S106 will be described below with reference to FIG. 3. It is judged in step S1061 whether or not the value of the flag intra_flag is "1". As a result of this judgment, if the value of the flag intra_flag is "1", the process advances to step S1062; if the value is "0", the process jumps to step S1064.

In step S1062, an intra coding mode (a mode for executing encoding according to the intra-frame coding method) is set as the coding mode for the frame of interest to be encoded by the encoding unit 102. That is, encoding according to the intra-frame coding method is executed for a target image after the prescribed number of frames or more in an input order counted from the previous target image, which was encoded according to the intra-frame coding method.

In step S1063, the value of the flag intra_flag is set to be "0". Then, the processing according to the flowchart shown in FIG. 3 ends, and the process advances to step S107.

On the other hand, it is judged in step S1064 whether or not the value of the variable b_count is equal to or larger than a variable p_period. The variable p_period represents an insertion interval of a frame to be encoded according to the forward predictive coding method, and its value is set in advance according to the number of frames which can be stored in the frame buffer 101.

As a result of this judgment, if the value of the variable b_count is equal to or larger than the variable p_period, the process advances to step S1065; otherwise, the process jumps to step S1067.

In step S1065, a forward predictive coding mode (a mode for executing encoding according to the forward predictive coding method) is set as the coding mode for the frame of interest to be encoded by the encoding unit 102. That is, encoding according to the forward predictive coding method is executed for the target image after the prescribed number of frames or more in the input order counted from the previous target image, which was encoded by the forward predictive coding method. In step S1066, the value of the variable b_count is initialized to "0".

On the other hand, in step S1067, a bi-directional predictive coding mode (a mode for executing encoding according to the bi-directional predictive coding method) is set as the coding mode for the frame of interest to be encoded by the encoding unit 102. That is, encoding according to the bi-directional predictive coding method is executed for a target image which is selected as neither an encoding target according to the intra-frame coding method nor that according to the forward predictive coding method of the target images. Then, in step S1068, the value of the variable b_count is incremented by "1".

Figure 6:
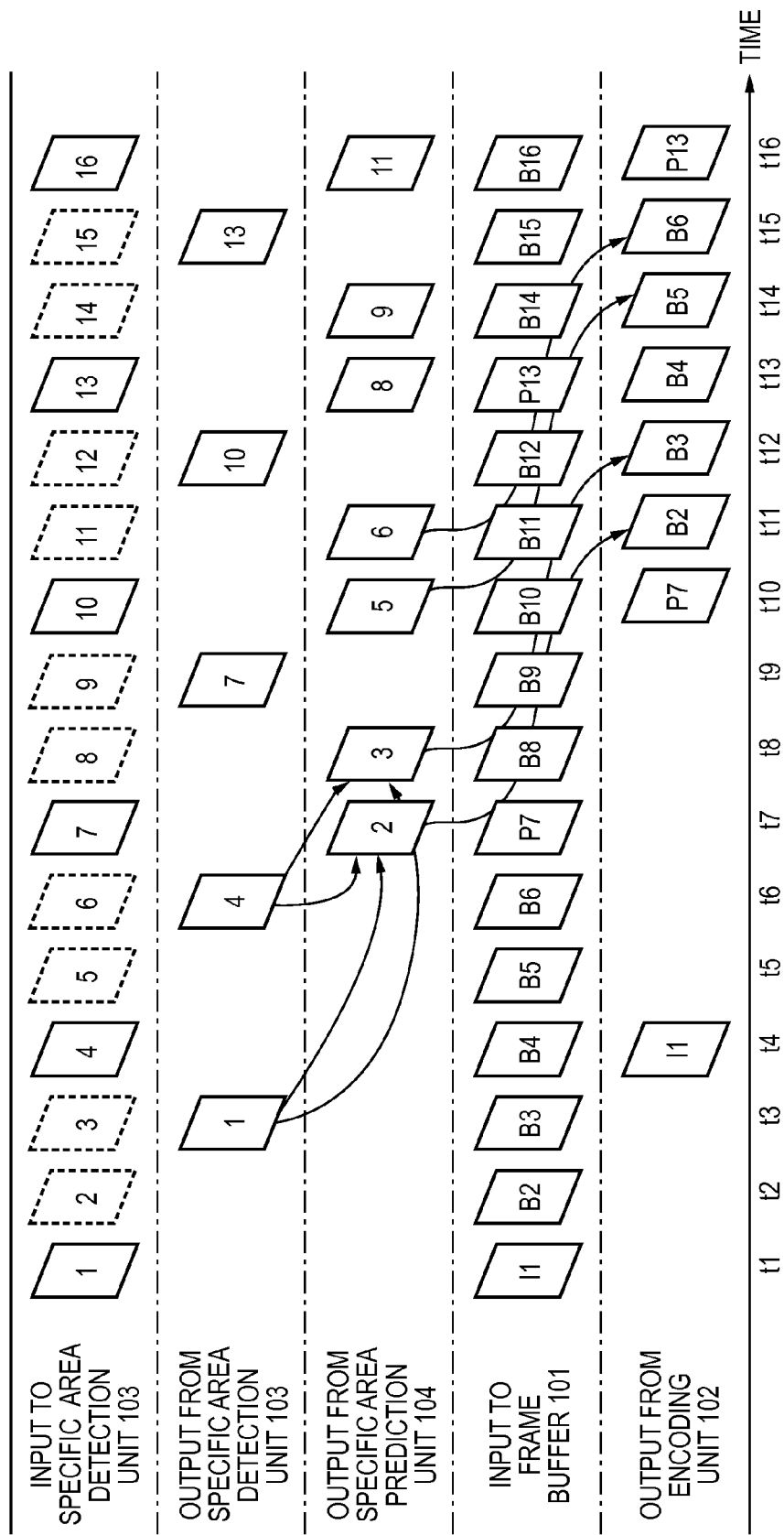
FIG. 6 is a timing chart showing input/output processes of respective units.

Frame input/output processes in the specific area detection unit 103, specific area prediction unit 104, frame buffer 101, and encoding unit 102 will be explained below with reference to the timing chart shown in FIG. 6. FIG. 6 shows frame input/output processes in the respective units at times t1 to t16.

To the frame buffer 101 and specific area detection unit 103, frames 1 to 16 are respectively input at times t1 to t16. The specific area detection unit 103 detects specific areas for each frame (target image) of frames 1, 4, 7, 10, 13, and 16, and the specific area prediction unit 104 predicts specific areas for each of frames 2, 3, 5, 6, 8, 9, 11, 12, 14, and 15.

For example, the specific area prediction unit 104 predicts specific areas in frames 2 and 3 (by interpolation using frames 1 and 4) using coordinate positions of specific areas output from the specific area detection unit 103 respectively at times t3 and t6. Then, the specific area prediction unit 104 outputs coordinate positions of the specific areas predicted for frame 2 at time t7, and those of the specific areas predicted for frame 3 at time t8.

The coordinate positions of the specific areas predicted for frame 2 are used to decide encoding parameters used when the encoding unit 102 encodes frame 2. As a result, the encoding unit 102 outputs the encoding result for frame 2 at time t11. Likewise, the coordinate positions of the specific areas predicted for frame 3 are used to decide encoding parameters used when the encoding unit 102 encodes frame 3. As a result, the encoding unit 102 outputs the encoding result for frame 3 at time t12.

Of frames 1 to 16 stored in the frame buffer 101, frame 1 (I1 in FIG. 6) is selected as that to be encoded according to the intra-frame coding method by the aforementioned processing. Frames 2 to 6, 8 to 12, and 14 to 16 (B2 to B6, B8 to B12, and B14 to B16 in FIG. 6) are selected as those to be encoded according to the bi-directional predictive coding method by the aforementioned processing. Also, frames 7 and 13 (P7 and P13 in FIG. 6) are selected as those to be encoded according to the forward predictive coding method by the aforementioned processing.

As described above, according to this embodiment, a frame in which a coordinate position of a specific area is predicted, that is, a frame other than that in which a specific area is directly detected, is encoded according to the bi-directional predictive coding method. In this embodiment, since MPEG-2 is used as the coding method, the frame which is encoded according to the bi-directional predictive coding method cannot be used as a reference frame. Hence, the frame in which the coordinate position of the specific area is predicted is not used as a reference frame in encoding.

Conventionally, since a frame in which a coordinate position of a specific area is predicted can be used as a reference frame at the time of encoding, image quality deterioration caused by control of quantization parameters may propagate. On the other hand, in this embodiment, since a frame in which a coordinate position of a specific area is predicted is not used as a reference frame at the time of encoding of subsequent frames, propagation of errors caused by the control of the quantization parameters can be reduced, thus improving image quality.

Note that in the H.264 coding method, a reference frame is managed while being registered in a list called a reference picture list. A coding mode corresponding to the bi-directional predictive coding mode of MPEG-2 is called a bi-predictive coding mode in H.264, and a frame encoded by this mode can be a reference frame upon execution of predictive encoding. That is, a frame which is encoded by the bi-predictive coding mode can be registered in the reference picture list. On the other hand, a frame encoded by the intra coding mode or forward predictive coding mode may be inhibited from being used as a reference frame, that is, such frame may be inhibited from being registered in the reference picture list. Therefore, when this embodiment is applied to the H.264 coding method, processing for setting the frame of interest as a non-reference frame, that is, that for inhibiting the frame of interest from being registered in the reference picture list is executed in step S104 of FIG. 2. Upon execution of this processing, the coding mode selected in step S104 is not always the bi-predictive coding mode.

In the H.264 coding method, a reference frame can be selected for each block. Therefore, as still another application method, a flag indicating that the frame of interest is a frame in which a coordinate position of a specific area is predicted may be registered in a memory (not shown) while registering the frame of interest in the reference picture list in step S104. In this case, this flag is referred to when a subsequent frame is encoded. Upon execution of predictive coding of a block including a specific area, processing for selecting a reference frame from those in which a specific area is directly detected is executed. Upon execution of predictive coding of a block which does not include any specific area, processing for selecting a reference frame from all frames registered in the reference picture list is executed.

Note that in the description of FIG. 6, a processing frame rate of the specific area detection unit 103 is constant. However, the present invention is not limited to the constant processing frame rate. Depending on properties of input moving image data, a calculation load on the specific area detection unit 103 may become heavy. In this case, the processing frame rate of the specific area detection unit 103 becomes variable. Then, the coding mode controller 106 can control the coding mode according to the presence/absence of an output from the specific area detection unit 103.

Furthermore, the specific area detection unit 103 may monitor the number of frames, which are temporarily stored in the frame buffer 101, may abort processing for detecting a specific area when the number of frames has reached a threshold, and may output the result before the processing is aborted to the coding mode controller 106. In this case, since the use size of the frame buffer 101 can be suppressed to a size designated by the threshold, a cost reduction can be attained.

Also, in this embodiment, target images are dispersed in a frame group according to a prescribed distribution. However, the target images can be images of prescribed frames, which are decided according to various situations, and a distribution of target images in images of respective frames is not particularly limited.

[Second Embodiment]

Only differences between this embodiment and the first embodiment will be described below. This embodiment is different from the first embodiment in that the variable p_period is set in advance to be "0" in the arrangement of the first embodiment.

In this case, since the value of the variable b_count becomes equal to or larger than the value of the variable p_period in step S1064, the process always advances to next step S1065. Thus, a coding mode for a target image as a frame in which a specific area is directly detected is always one of the intra coding mode and forward predictive coding mode.

In this embodiment as well, since an image of a frame in which a specific area is predicted is encoded according to the bi-directional predictive coding method, this frame is not used as a reference frame when a subsequent frame is encoded.

Figure 7:
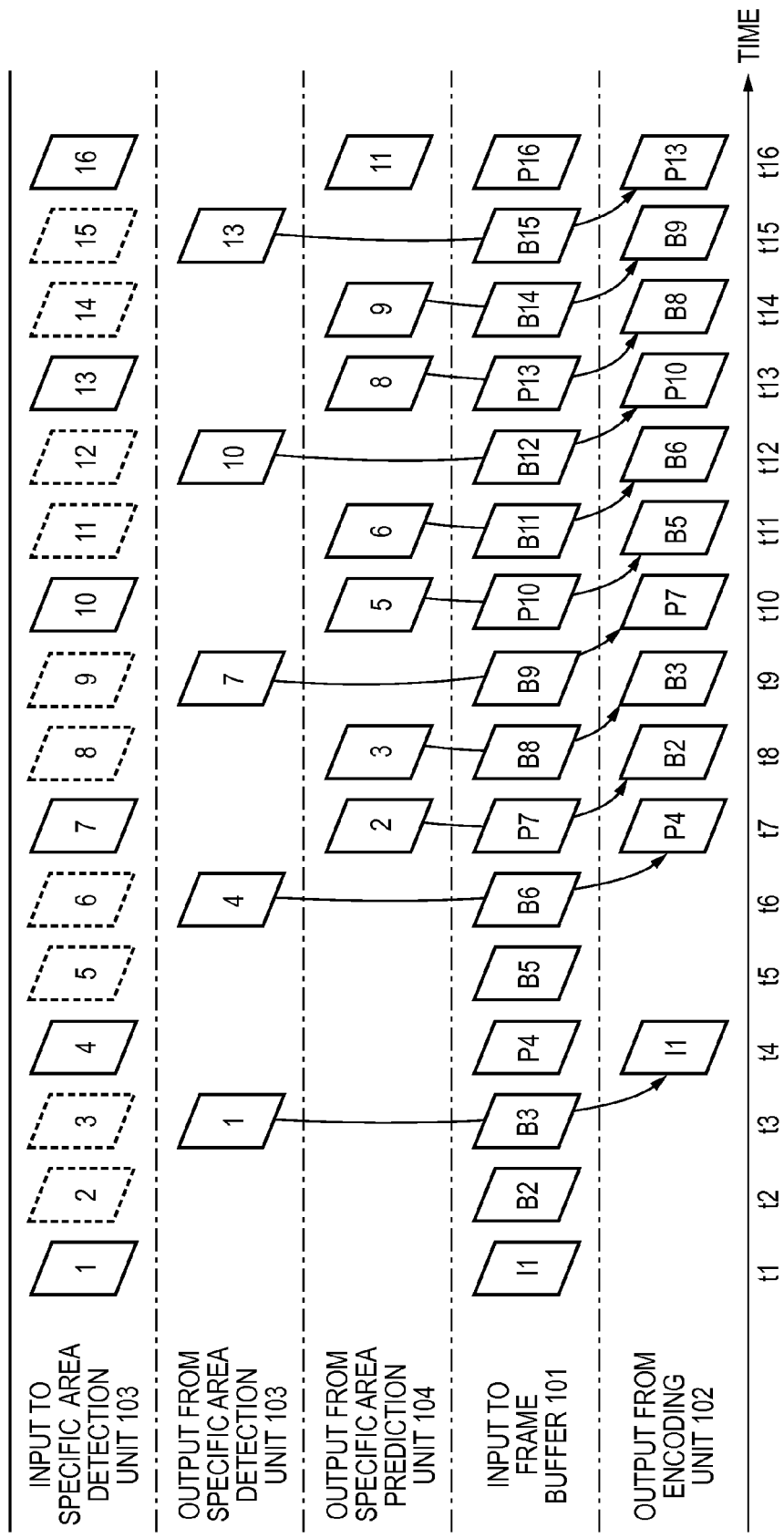
FIG. 7 is a timing chart showing input/output processes of respective units.

Frame input/output processes in the specific area detection unit 103, specific area prediction unit 104, frame buffer 101, and encoding unit 102 will be described below with reference to the timing chart shown in FIG. 7. FIG. 7 shows input/output processes in the respective units at times t1 to t16. Differences from FIG. 6 lie in that the interval of interpolation processing by the specific area prediction unit 104 becomes the same as that of encoding processing according to the bi-directional predictive coding method by the encoding nit 102.

For example, coordinate positions of specific areas in frames 1, 4, 7, 10, and 13 output from the specific area detection unit 103 are used to decide encoding parameters used respectively when the encoding unit 102 encodes frames I1, P4, P7, P10, and P13. In this case, all of these frames are used by the encoding unit 102 at times (t4, t7, t10, t13, and t16) next to output times (t3, t6, t9, t12, and t15) from the specific area detection unit 103. Also, coordinate positions of specific areas in frames 2, 3, 5, 6, 8, and 9 which are output from the specific area prediction unit 104 are used respectively when the encoding unit 102 encodes frames B2, B3, B5, B6, B8, and B9. In this case, all of these frames are used by the encoding unit 102 at times (t8, t9, t11, t12, t14, and t15) next to output times (t7, t8, t10, t11, t13, and t14) from the specific area prediction unit 104.

On the other hand, frame input/output processes in the specific area detection unit 103, specific area prediction unit 104, frame buffer 101, and encoding unit 102 upon execution of encoding without setting the equal interval of the interpolation processing using the related art will be described below with reference to the timing chart shown in FIG. 8.

As shown in FIG. 8, even when the interval of frames to be encoded in the forward predictive coding mode is shortened, a coordinate position of a specific area predicted for frame 3 (time t8) has to be waited to encode the second frame (P3) in a stream. Hence, a total of seven frames B2 to B8 have to be stored in the frame buffer 101 until second frame P3 is output at time t9 in the related art.

On the other hand, in this embodiment, a coordinate position of a specific area predicted for frame 4 is obtained at time 6, and the encoding result of second frame P4 in the stream can be output at time t7, as shown in FIG. 7. Hence, a total of five frames B2 to B6 need only be stored in the frame buffer 101 before second frame P4 is output. Therefore, a memory size required for the frame buffer 101 can be reduced by two frames compared to the related art. In this case, in FIG. 8, even when the prediction result of frame 2 is output from the specific area prediction unit 104 prior to frame 3, the second frame (P3) in the stream can be encoded at time t8. Hence, the memory size required for the frame buffer 101 is still smaller in this embodiment.

As described above, according to this embodiment, a size of the frame buffer can be reduced to attain a cost reduction, while improving the prediction accuracy of a specific area by interpolation. As in the first embodiment, since a frame in which a coordinate position of a specific area is predicted is not used as a reference frame upon encoding of subsequent frames, error propagation due to control of the encoding parameters can be reduced, thus improving image quality.

According to the aforementioned embodiments, since a coding mode of a frame including a predicted specific area is set as that with which the encoded frame is not referred to from other frames, even when prediction of a specific area falls short, propagation of errors by encoding parameters can be prevented, and image quality can be improved.

Since the frame interval of the interpolation processing in prediction of a specific area is set to be equal to that of the interpolation prediction processing in encoding, a cost required for the frame buffer can be reduced while improving the prediction accuracy of a specific area.

[Third Embodiment]

Figure 1:
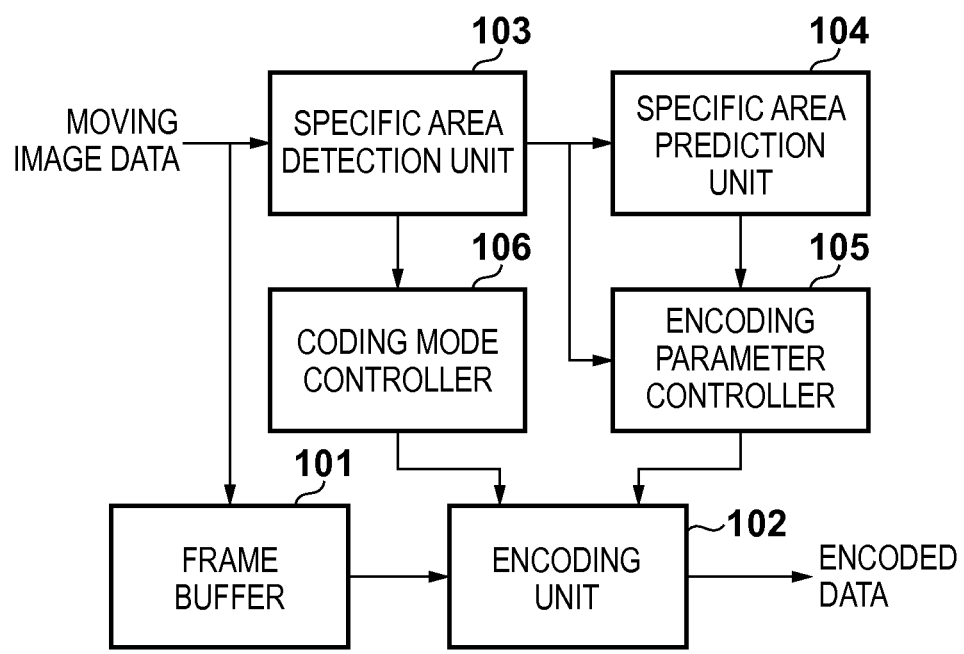
FIG. 1 is a block diagram showing an example of the functional arrangement of an image processing apparatus.

All of the respective units shown in FIGS. 1 and 4 may be implemented by hardware. Alternatively, the frame buffer 101 (201) may be implemented as a memory such as a RAM or hard disk, and other units may be implemented by software (computer programs). In this case, when a CPU of a computer which has this memory and also a memory required to store these software programs executes the software programs, this computer executes the respective processes described in the first and second embodiments.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-112896 filed May 19, 2011 which is hereby incorporated by reference herein in its entirety.

What is claimed is:

1. An image processing apparatus comprising:
   an input unit configured to input image frames included in a moving image;
   a detection unit configured to detect a specific area from a target image frame which is selected from the image frames;
   a prediction unit configured to predict a position of the specific area in a non-target image frame on the basis of a position of the specific area which is detected by said detection unit from the target image frame; and
   an encoding unit configured to encode the image frames so that the specific area is encoded to have higher image quality than an area other than the specific area, and
   so that the non-target image frame is not referred to in order to encode another image frame.

2. The apparatus according to claim 1, wherein said encoding unit executes encoding according to an intra-frame coding method for the target image frame after not less than the prescribed number of frames in an input order counted from the previous target image frame which was encoded according to the intra-frame coding method.

3. The apparatus according to claim 2, wherein said encoding unit executes encoding according to a forward predictive coding method for the target image frame after not less than the prescribed number of frames in an input order counted from the previous target image frame which was encoded according to the forward predictive coding method.

4. The apparatus according to claim 3, wherein said encoding unit executes encoding according to a bi-directional predictive coding method for a target image frame which is selected as neither an encoding target according to the intra-frame coding method nor an encoding target according to the forward predictive coding method of the target images frame.

5. The apparatus according to claim 1, wherein said prediction unit predicts the position of the specific area in the non-target image frame on the basis of a first position of the specific area in a first target image frame and a second position of the specific area in a second target image frame.

6. An image processing method, comprising:
   an input step to input image frames included in a moving image;
   a detection step to detect a specific area from a target image frame which is selected from the image frames;
   a prediction step to predict a position of the specific area in a non-target image frame on the basis of a position of the specific area which is detected by said detection step from the target image frame; and
   an encoding step to encode the image frames so that the specific area is encoded to have higher image quality than an area other than the specific area, and
   so that the non-target image frame is not referred to in order to encode another image frame.

7. A non-transitory computer-readable storage medium storing a computer program for controlling a computer to function as respective units of an image processing apparatus of claim 1.

8. The method according to claim 6, wherein the encoding step includes a step of executing encoding according to an intra-frame coding method for the target image frame after not less than the prescribed number of frames in an input order counted from the previous target image frame which was encoded according to the intra-frame coding method.

9. The method according to claim 8, wherein the encoding step includes a step of executing encoding according to a forward predictive coding method for the target image frame after not less than the prescribed number of frames in an input order counted from the previous target image frame which was encoded according to the forward predictive coding method.

* * * * *